United States Patent
Curtis

(10) Patent No.: US 8,249,391 B2
(45) Date of Patent: Aug. 21, 2012

(54) USER INTERFACE METHOD FOR SKEW CORRECTION

(75) Inventor: Donald B. Curtis, Highland, UT (US)

(73) Assignee: Ancestry.com Operations, Inc., Provo, UT (US)

( * ) Notice: Subject to any disclaimer, the term of this patent is extended or adjusted under 35 U.S.C. 154(b) by 1006 days.

(21) Appl. No.: 11/844,443

(22) Filed: Aug. 24, 2007

(65) Prior Publication Data

US 2009/0052802 A1 Feb. 26, 2009

(51) Int. Cl.
*G06K 9/32* (2006.01)
*G06K 9/36* (2006.01)
*G09G 5/00* (2006.01)

(52) U.S. Cl. ........ 382/289; 382/287; 382/276; 382/296; 382/297; 345/648; 345/657

(58) Field of Classification Search ............... 382/289
See application file for complete search history.

(56) References Cited

U.S. PATENT DOCUMENTS

| | | | | |
|---|---|---|---|---|
| 4,654,805 A * | 3/1987 | Shoup, II | | 358/1.3 |
| 4,866,784 A * | 9/1989 | Barski | | 382/289 |
| 5,054,098 A * | 10/1991 | Lee | | 382/289 |
| 5,093,653 A | 3/1992 | Ikehira | | |
| 5,181,260 A * | 1/1993 | Kurosu et al. | | 382/289 |
| 5,187,753 A * | 2/1993 | Bloomberg et al. | | 382/289 |
| 5,307,452 A * | 4/1994 | Hahn et al. | | 345/592 |
| 5,483,626 A * | 1/1996 | Nakayama | | 345/645 |
| 5,563,403 A * | 10/1996 | Bessho et al. | | 250/208.1 |
| 5,568,600 A * | 10/1996 | Kaba | | 345/648 |
| 6,097,855 A * | 8/2000 | Levien | | 382/296 |
| 6,282,326 B1 * | 8/2001 | Lee et al. | | 382/289 |
| 6,333,997 B1 * | 12/2001 | Hashiya et al. | | 382/201 |
| 6,360,026 B1 * | 3/2002 | Kulkarni et al. | | 382/289 |
| 6,418,244 B2 * | 7/2002 | Zhou et al. | | 382/306 |
| 6,430,320 B1 | 8/2002 | Jia et al. | | |
| 7,027,666 B2 * | 4/2006 | Rudak et al. | | 382/289 |
| 7,065,261 B1 * | 6/2006 | Horie | | 382/289 |
| 7,145,699 B2 * | 12/2006 | Dolan | | 358/452 |
| 7,277,600 B2 * | 10/2007 | Najman | | 382/289 |
| 7,340,110 B2 * | 3/2008 | Lim et al. | | 382/289 |
| 7,542,165 B2 * | 6/2009 | Kawakatsu et al. | | 358/1.3 |
| 2002/0164087 A1 * | 11/2002 | Chien et al. | | 382/289 |
| 2004/0120604 A1 * | 6/2004 | Najman | | 382/289 |
| 2004/0130552 A1 * | 7/2004 | Duluk et al. | | 345/506 |
| 2005/0031167 A1 * | 2/2005 | Hu et al. | | 382/103 |
| 2005/0058367 A1 * | 3/2005 | Fujimoto | | 382/276 |

OTHER PUBLICATIONS ftp://ftp.gimp.org/pub/gimp/v2.2/ (2.2.12 on Jul. 6, 2006).*
http://web.archive.org/web/20060718040101/http://docs.gimp.org/en/gimp-tool-rotate.html (Jul. 18, 2006).*

* cited by examiner

*Primary Examiner* — Michelle Entezari

(74) *Attorney, Agent, or Firm* — Kilpatrick Townsend & Stockton LLP

(57) ABSTRACT

Methods and systems for correcting skew in digital images are disclosed according to embodiments of the invention. Embodiments may include receiving the endpoints of the skew-line, calculating the sine and cosine of the skew-angle from the endpoints and rotating the image using the sine and cosine of the skew-angle. Embodiments of the invention may also include various ways for a user to provide a skew-line and/or endpoints.

21 Claims, 9 Drawing Sheets

Image Skew is the angle between a horizontal line and an element of an image that should be horizontal.

USER INTERFACE METHOD FOR SKEW CORRECTION

BACKGROUND OF THE INVENTION

This disclosure relates in general to skew correction and, but not by way of limitation, to skew correction for scanned documents amongst other things.

When digitizing document pages, whether from paper, books, microfilm, or other sources, it is often the case that the resulting image contains some amount of skew. The skew in a digitized document may result from the scanning process or may be an affect from the original document source. In some cases skew can be found in documents digitized or needing to be digitized for the purpose of optical character recognition (OCR). Skew can be defined as the angle between a reference line, such as a horizontal line, and an element of an image that should be parallel with the reference line.

To correct for skew, the magnitude and the direction of the skew must be known in order to deskew an image. A number of automatic techniques have been developed to correct for skew. These techniques, however, are not perfect. Some images with skew are not deskewed and other non-skewed images become skewed as a result of an automatic deskew algorithm. Such skewed images may need to be deskewed manually.

Manual deskewing can be difficult, time consuming and frustrating. In some cases, the operator may manually rotate an image using a pointing device such as a mouse. In other cases, the user may be required to enter a skew-angle or a rotation angle—a concept not easily understood by many users. This may result in a potentially laborious two step process: to estimate or calculate a rotation angle and then to enter the rotation angle. Once the angle is entered into a computer system, the image is rotated accordingly. Often an estimated rotation angle is incorrect, requiring the user to enter additional estimated rotation angles until the user is satisfied with the new orientation of the image. If large numbers of images require deskewing, a two-step process such as the one described can be time consuming and inaccurate. It may take multiple tries for a user to successfully arrive at the correct (or approximately correct) skew-angle and properly deskew an image.

Accordingly, there is a need in the art for improved user-coordinated deskewing techniques.

BRIEF SUMMARY OF THE INVENTION

A method for correcting skew in an image is disclosed according to one embodiment of the invention. The skew-angle may be defined by the intersection of a skew-line with respect to a reference line, such as a horizontal line or a vertical line. The method may include receiving two distinct points of a skew-line from a user. The two points may be intermediate points on the skew-line or the endpoints of the skew-line. The image is rotated so that the skew-line is parallel with the reference line, without the need for the user to be aware of or to calculate or to guess at the skew-angle. The only action required of the user is to pinpoint two positions on a skew-line. Internally, the sine and cosine of the skew angle may be calculated from the two skew-line points, without the need to calculate the actual angle of skew. The image may then be rotated based on the sine and cosine of the skew angle. For example, if two points are specified for a skew-line whose skew angle is 11°, the sine and cosine may be calculated from the two points without ever determining the skew angle and then the image may be rotated −11°. In some cases when a skewed image is deskewed the resulting image is not framed well within the margins because a skewed image may present a wider and/or taller image. Accordingly, the image may be cropped after being deskewed.

A user interface may be used to display the image, receive the two points of the skew-line, draw the skew-line and redraw the deskewed image. Moreover, the skew-line may be erased from a display after rotation.

Another method for correcting skew in an image is disclosed according to one embodiment of the invention. The method may include receiving a first and second endpoint from a user through a user interface. From these endpoints, the sine and cosine of the skew-angle may be calculated with respect to a reference line. Using the sine and cosine of the skew-angle, the image may be rotated the magnitude of the skew-angle and in a direction opposite the skew-angle.

A computer system that may be used to deskew an image is also disclosed according to one embodiment of the invention. The computer system may include a user interface comprising a pointing device, a display, a processor and memory. The memory may include instructions to store an image in the memory and display the image on the display. The memory may also include instructions to receive a first endpoint and a second endpoint from a user through the pointing device. The memory may further include instructions to calculate the sine and cosine of the skew-angle based on the first and second endpoints and then rotate the image using the sine and cosine of the skew-angle.

The memory may also include instructions to display a symbol representing the first endpoint and a symbol representing the second endpoint on the display, and instructions to draw a line defined by the first endpoint and the second endpoint on the display. The image may then be rotated using the sine and cosine of the skew-angle. Once the image has been rotated, the line defined by the first endpoint and the second endpoint may be erased (if drawn). The memory may further include instructions to crop the image. The instructions in the memory may also include instructions to display the image after rotation and/or cropping.

A computer program product for deskewing images is also disclosed according to one embodiment of the invention. The computer program may include a computer readable medium encoded with program code for controlling operation of a computer system. The program code may control the computer system to display an image and receive a first endpoint and a second endpoint from a user through a pointing device. The program code may also calculate the sine and cosine of the skew-angle and rotate the image using the sine and cosine.

Another computer system for deskewing an image is also disclosed according to one embodiment of the invention. The computer system may include a user interface comprising, a processor and memory. The user interface may include a pointing device, a scanner and a display. The memory may include instructions to receive an image of a document from a scanner and store the image in memory. The memory may also include instructions to check the image for skew and display the image on the display. The memory may also include instructions to receive a first endpoint and a second endpoint from a user through the pointing device and to calculate with the processor the sine and cosine of the skew-angle, which is the angle between a horizontal line and a line defined by the first endpoint and the second endpoint. The image may be rotated using the sine and cosine of the skew-angle.

Further areas of applicability of the present disclosure will become apparent from the detailed description provided hereinafter. It should be understood that the detailed description

In the appended figures, similar components and/or features may have the same reference label. Further, various components of the same type may be distinguished by following the reference label with a dash and a second label that distinguishes among the similar components. If only the first reference label is used in the specification, the description is applicable to any one of the similar components having the same first reference label irrespective of the second reference label.

DETAILED DESCRIPTION OF THE INVENTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It being understood that various changes may be made in the function and arrangement of elements without departing from the spirit and scope as set forth in the appended claims.

In one embodiment, the present disclosure provides methods for manually correcting skew in a digital image. A user may be presented with a skewed image. The image may have been previously scanned and may also have previously been operated on or checked by an automated skew correction algorithm. The user identifying the skew may draw a skew-line on the image using some sort of user interface such as, for example, a pointing device, mouse, stylus, keyboard, or touch screen, etc. The skew-line may be drawn by the user along a line or feature within the image that the user knows or thinks should be horizontal. Once the skew-line has been drawn, the computer system may calculate the sine and cosine of the skew-angle of the skew-line, for example as measured from a horizontal line. Once the sine and cosine are determined by the computer system, the image may be rotated the magnitude of the skew-angle in a direction opposite the skew-angle, without the need to calculate the skew angle or to report the skew-angle back to the user.

In another embodiment, the present disclosure provides for a computer system that includes instructions to correct for skew. The computer system may include a user interface including a display and input device. The computer system provides a user interface on the display for providing an image to a user. The user interface also provides functionality for a user to draw a skew-line. The system may then determine the sine and cosine of a skew-angle between the skew-line and a reference line and then rotate the image accordingly. The reference line may be a horizontal line or a vertical line.

Figure 1A:
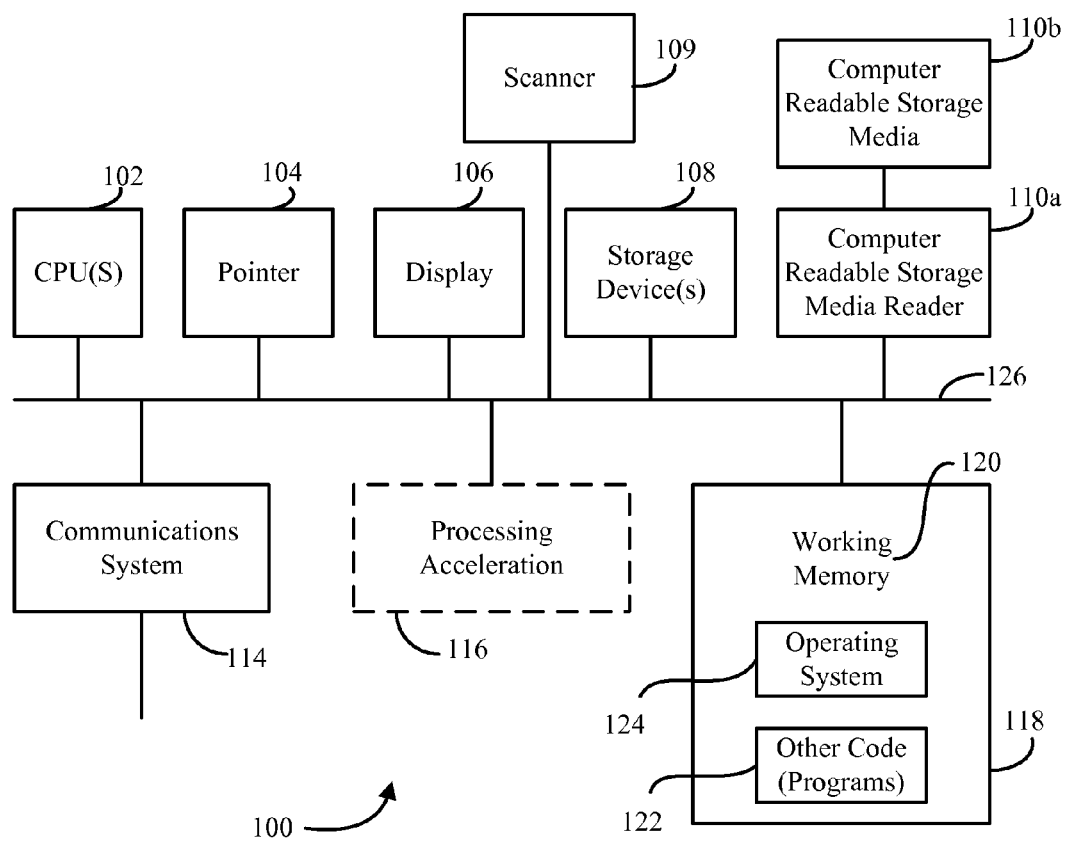
FIG. 1A shows a schematic illustration of a physical structure of a computer system that may be used to implement embodiments of the invention.

FIG. 1A shows a schematic illustration of a physical structure of a computer system 100 that may be used to implement embodiments of the invention. FIG. 1A broadly illustrates how individual system elements may be implemented in a separated or more integrated manner. The host system 100 is shown comprised of hardware elements that are electrically coupled via bus 126, including the host processor 102, an input device 104, an output device 106, a storage device 180, a scanner 109, a computer-readable storage media reader 10a, a communications system 114, a processing acceleration unit 116 such as a DSP or special-purpose processor, and a memory 118. The computer-readable storage media reader 10a may be further connected to a computer-readable storage medium 110b, the combination comprehensively representing remote, local, fixed, and/or removable storage devices plus storage media for temporarily and/or more permanently containing computer-readable information. The communications system 114 may comprise a wired, wireless, modem, and/or other type of interfacing connection and permits data to be exchanged with a communication network such as the Internet or an intranet.

The host system 100 also comprises software elements, shown as being currently located within working memory 120, including an operating system 124 and other code 122, such as a program designed to implement methods of the invention. It will be apparent to those skilled in the art that substantial variations may be made in accordance with specific requirements. For example, customized hardware might also be used and/or particular elements might be implemented in hardware, software (including portable software, such as applets), or both. Further, connection to other computing devices such as network input/output devices may be employed.

Figure 1B:
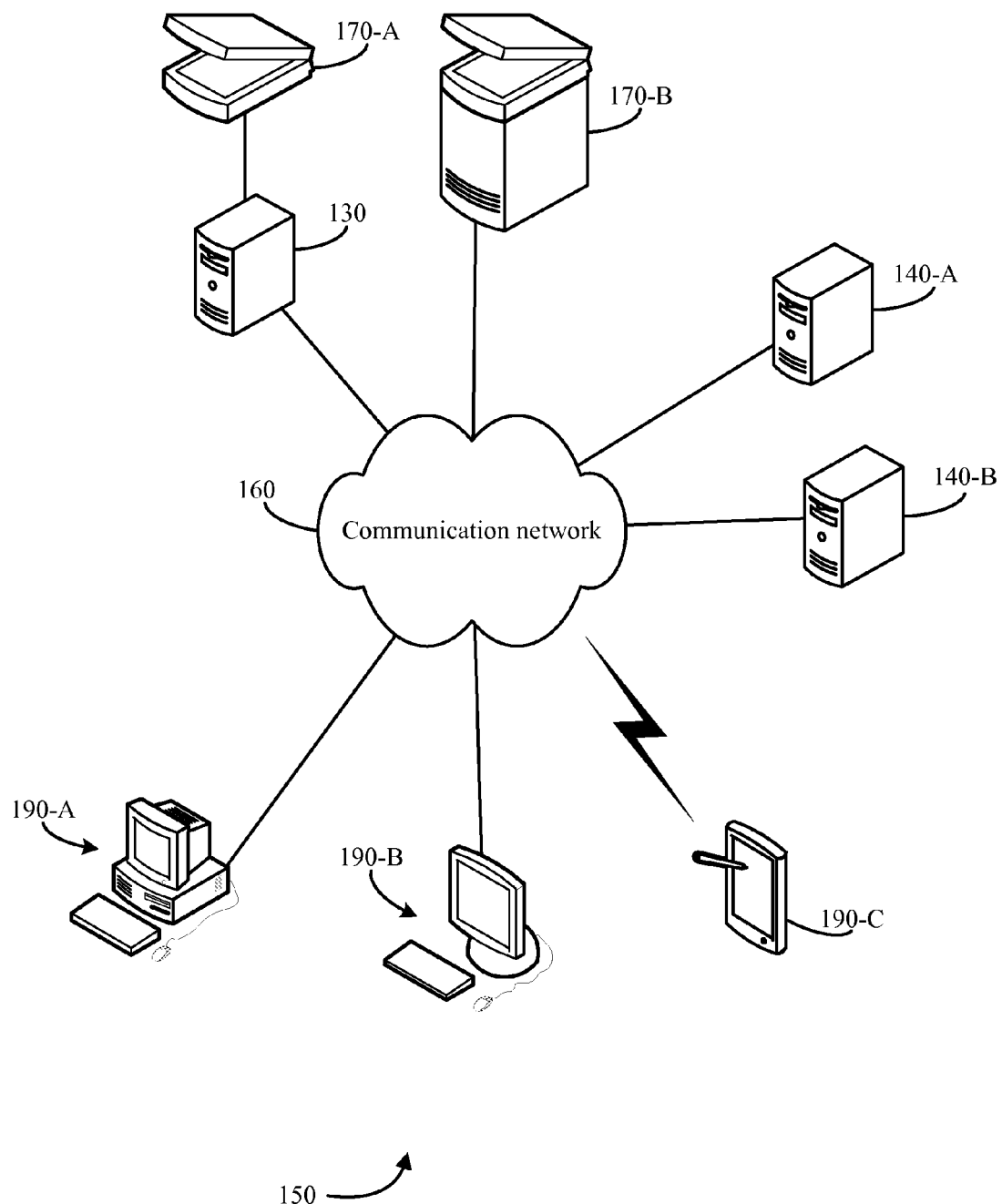
FIG. 1B shows a schematic illustration of a computer network that may be used to implement embodiments of the invention.

FIG. 1B shows a schematic illustration of a computer network 150 that may be used to implement embodiments of the invention. The computer network includes a variety of computer systems 190. Such computer systems 190 may include the architecture shown in FIG. 1A. The computer systems may include user interfaces such as a keyboard, mouse, stylus, touch screen, display, etc. Each of the computer system 190 are in communication with a communication network 160 such as, for example, the Internet or an intranet. For example, computer system 190-C is wirelessly connected to the communication network 160. The computer network 150 also includes scanners 170-A and 170-B. Scanner 170-A is coupled with a computer system 130. The computer system 130 controls and operates the functionality of the scanner 170-A as well as stores scanned images and communicates with the communication network 160. Scanner 170-B includes a computer system that is capable of storing images and sending images to other devices on the network. The computer network 150 also includes image storage devices 140. These image storage devices can be used to store images scanned by the scanners. Operators of the computer systems 190 may access the images storage in the image storage devices 140 through the network 160. Other embodiments may include other network storage devices or may store images at the computer systems or other locations.

Figure 1C:
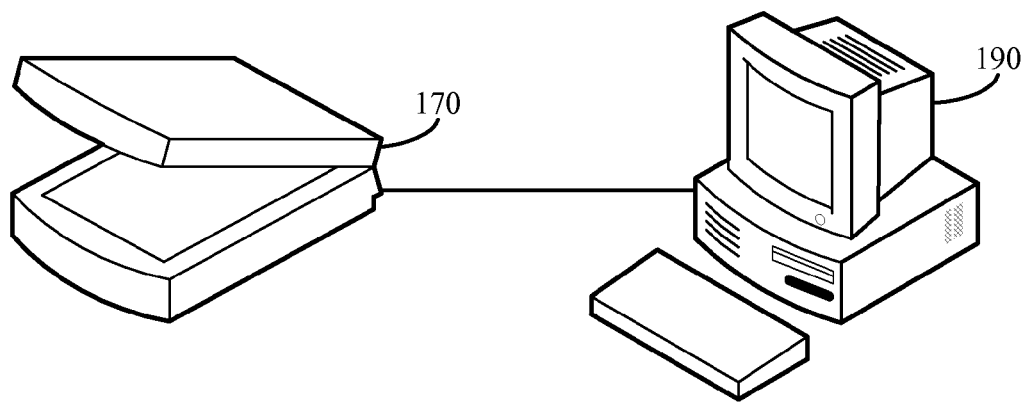
FIG. 1C shows another schematic illustration of another computer system that may be used for embodiments of the invention.

FIG. 1C shows another schematic illustration of another computer system that may be used for embodiments of the invention. The computer system includes a computer 190 with a display and input devices. The computer 190 is coupled with a scanner 170. The computer 190 may control the operation of the scanner. A user may scan an image with the scanner 170 that may be saved on the computer 190. The image may then be displayed on the computer display. The user may then employ embodiments of the invention to correct for skew.

Figure 2A:
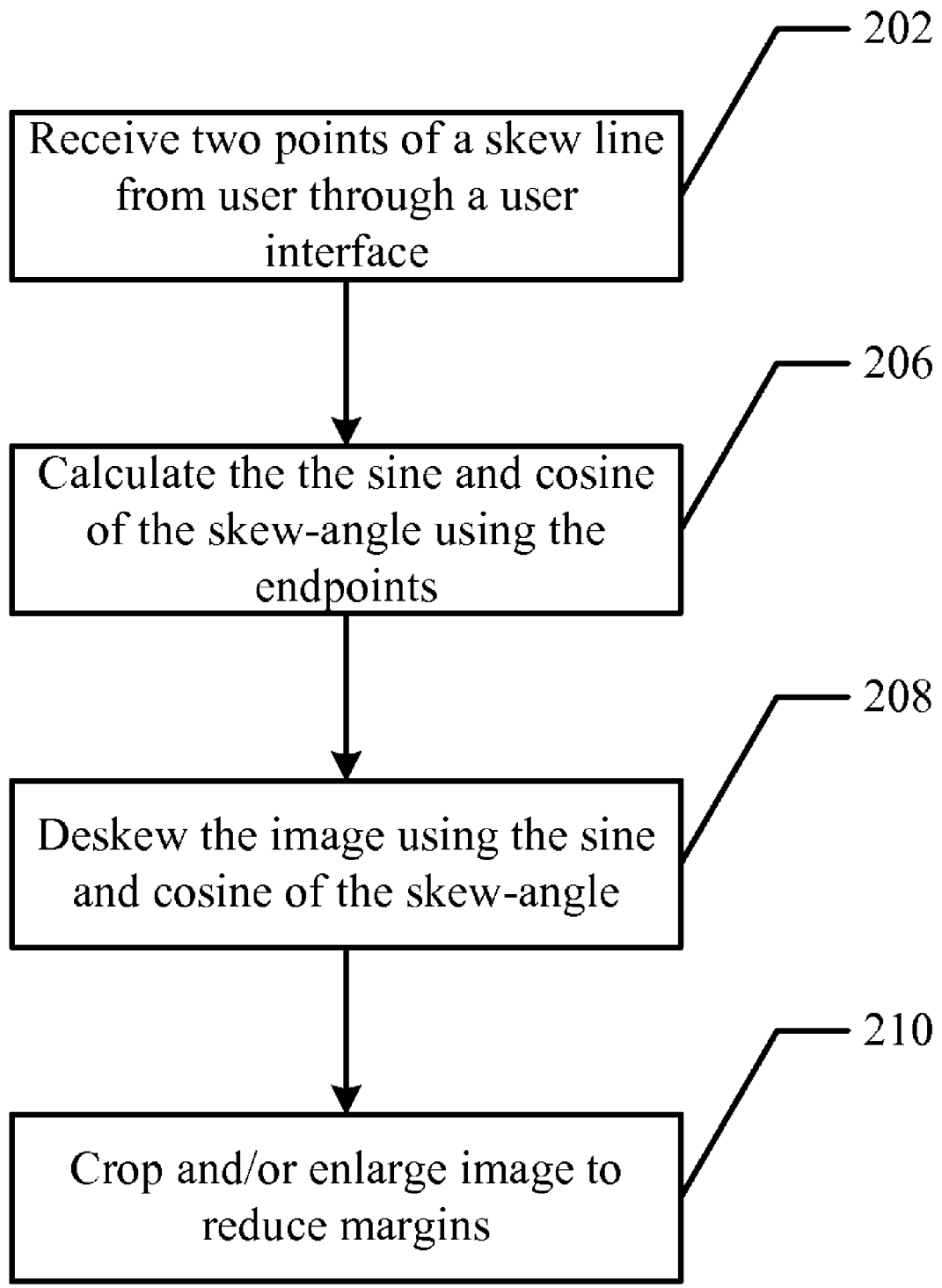
FIG. 2A shows a flowchart of a process for deskewing a digital image according to one embodiment of the invention.

FIG. 2A shows a flowchart of a process for deskewing a digital image according to one embodiment of the invention. A user at a computer system, such the computer system shown in FIG. 1A or the systems coupled to the network in FIG. 1B, may access a digital image. The image, for example, may be accessed from the image storage devices shown in FIG. 2B or from another digital storage location. The stored digital image may have previously been checked for skew by an automated skew algorithm. These automated skew algorithms are not error proof. For instance, such algorithms may not properly deskew images, may miss skewed images and may skew images that don't require deskewing. Accordingly, such images may require manual checking for skew as well as manually deskewing the images.

The digital image may be displayed on a display at the user's computer system. The computer system includes software that may allow the user to deskew the image. The software may operate any of the embodiments described in this disclosure. The user may visually check the image for skew. If the image is skewed the user may, for example, enter skew correction mode. The use may enter skew correction mode by typing a particular keystroke or pressing a particular button on the display with a mouse. The display may visually or audibly indicate that the system has entered skew correction mode. For example, the system may provide feedback by changing the cursor associated with the mouse, changing something on the display to indicate the system is now in skew correction mode, etc.

The computer system may then receive two points of a skew-line from the user through the user interface at block 202. For example, the user may move the cursor to a first position and click and hold a mouse button. The user may then drag a line from the first position to a second position where the user releases the mouse button. The system may draw a skew-line between the first position and the second position. The skew-line may be dynamically drawn while the user drags the cursor to the second position. As another example, the user may click and release a mouse button at a first position and then at a second position. The skew-line may then be drawn between the first and second positions. The user may draw the skew-line along a line within the image or along a part of the image that the user believes should be horizontal but is not. Other methods of receiving a skew-line may also be used. The user may use a variety of input devices, such as touch screens, pen pointers, styluses, laser pointers, key boards, etc.

Once the user has drawn a skew-line on the image, the user may be required to select whether the line is correct. Alternatively, the user may be queried whether the skew-line is correct. The user may adjust the line by dragging on the endpoints of the line or redrawing the line. The endpoints may be determined, for example, in pixels or in other coordinates. The endpoints may be determined based on the location of the line on the screen after the line has been drawn or based on the pointing device as the line is being drawn. Those skilled in the art will recognize various software or computer routines, algorithms or calls that can be used to specify the endpoints of the skew-line.

Once the endpoints of the skew-line have been specified, a transformation from the skewed image to a deskewed image may occur. If the endpoints of the skew-line are in Cartesian coordinates, such as, $(x_1, y_1)$ and $(x_2, y_2)$ the sine and cosine of the skew-angle may be calculated, at block 206, using the following:

$$\sin(\theta) = \frac{(y_2 - y_1)}{\sqrt{(y_2 - y_1)^2 + (x_2 - x_1)^2}}, \text{ and} \qquad \text{eqn. 1}$$

$$\cos(\theta) = \frac{(x_2 - x_1)}{\sqrt{(y_2 - y_1)^2 + (x_2 - x_1)^2}}. \qquad \text{eqn. 2}$$

To avoid flipping the image upside down, a check may be made to see whether the cosine is a negative value, and if so, the sine and cosine are both negated. A transformation from a skewed image space (x, y) to deskewed image space (x', y') may occur at block 208. A pixel at point (x, y) in the skewed image is transformed to (x', y') in the deskewed image using the following:

$$x'(x,y) = x\cos(\theta) + y\sin(\theta), \text{ and} \qquad \text{eqn. 3}$$

$$y'(x,y) = y\cos(\theta) - x\sin(\theta). \qquad \text{eqn. 4}$$

The lowest values of the of the transformed coordinates of the corners of the image, $y_{min}'$ and $x_{min}'$, may be subtracted from each transformation value. Once these images are deskewed or rotated, the margins may be too large. Thus, after the image is deskewed the image may then be cropped at block 210.

Figure 2B:
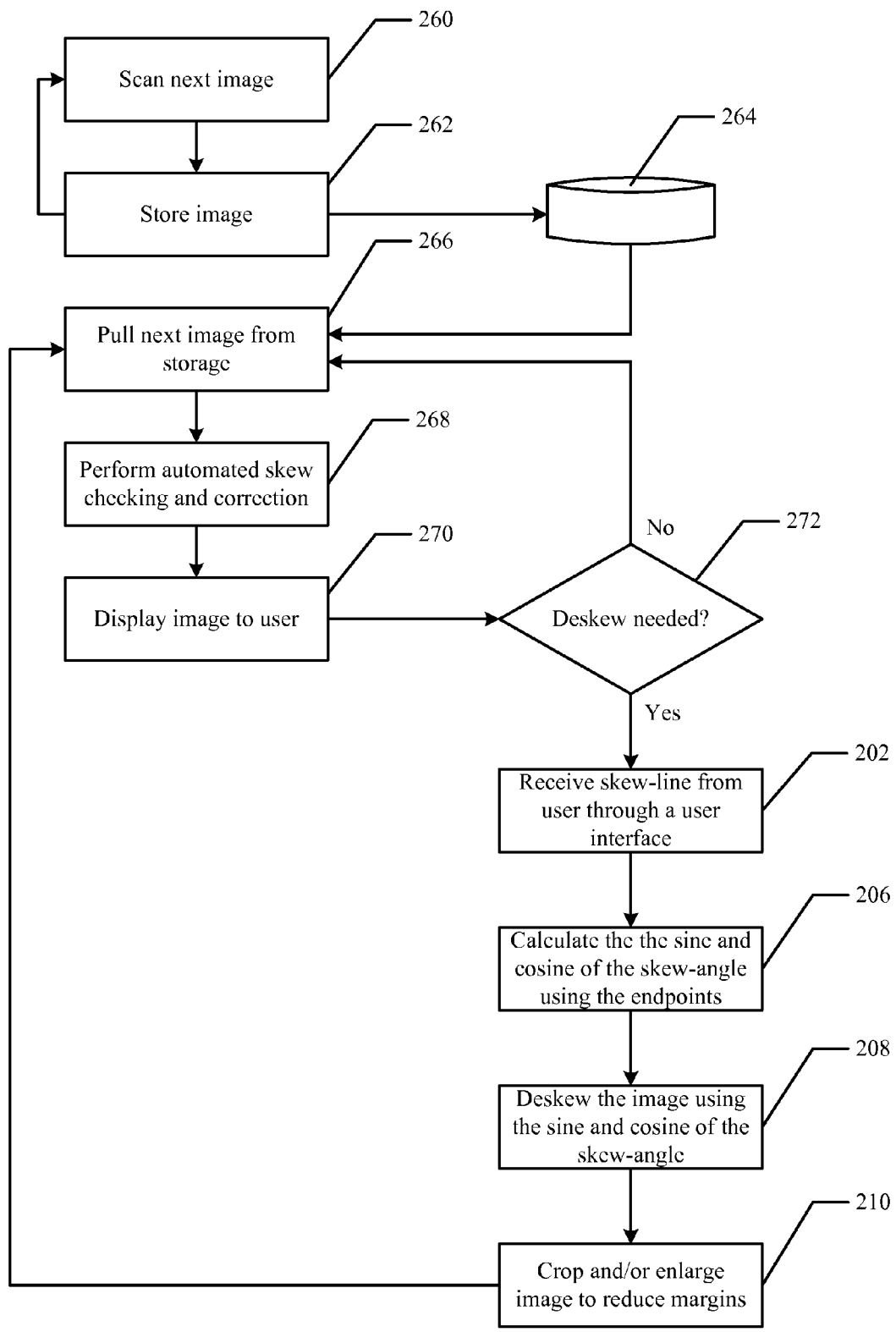
FIG. 2B shows another flowchart of a process for deskewing a digital image according to another embodiment of the invention.

FIG. 2B shows another flowchart of a process for deskewing a digital image according to another embodiment of the invention. The process begins by scanning the next image in a queue at block 260. To initiate the process a user may require a first image to be scanned. Moreover, an automatic book scanner or scanner that is capable of scanning a plurality of sheets one after another may be used. Once scanned, the images are stored in block 262 in some sort of long term digital storage device and/or facility 264. The images may be stored on a local or remote hard drive(s). Once an image is stored or while the image is being stored the process scans the next image in the queue at block 260.

An image may then be pulled from the storage location 264 at block 266. The image may be pulled by the same or a different computer system. An auto skew-detection and/or correction algorithm may be performed on the image at block 268. In many cases, this algorithm may correct for detected skew. In other cases, the algorithm may not detect skew in an image or falsely detect for skew in an image.

The image may then be displayed to a user through the user interface of a computer system at block 270. The user may then determine whether the image is skewed or not skewed at block 272. If the image is not skewed then the next image is pulled from storage at block 266 and the process continues. If skew is detected and deskew is needed, then the user is asked to draw a skew-line that represents the angle of skew in the image at block 202. Block 202, 206, 208 and 210 follow the blocks described in relation to FIG. 2A. Following block 210, the next image is pulled from storage and the process continues.

In another embodiment of the invention, once the automated skew checking and correction occurs at block 268, the image is stored. The image may be stored in the same storage as before in a different storage folder or in a new storage location. The user interactive steps may then first pull the image from the storage location prior to displaying at block 270. The automated deskew algorithm, for example, may also be performed after the image is scanned between blocks 260 and 262.

Figure 3A:
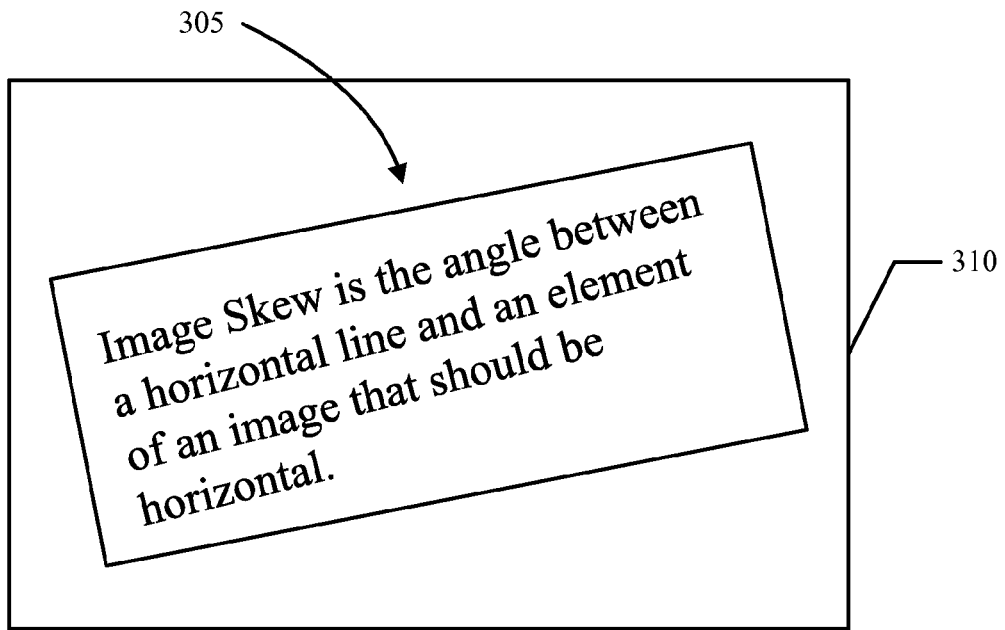
FIGS. 3A-3H show screenshots of various steps according to embodiments of the invention.
Figure 3B:
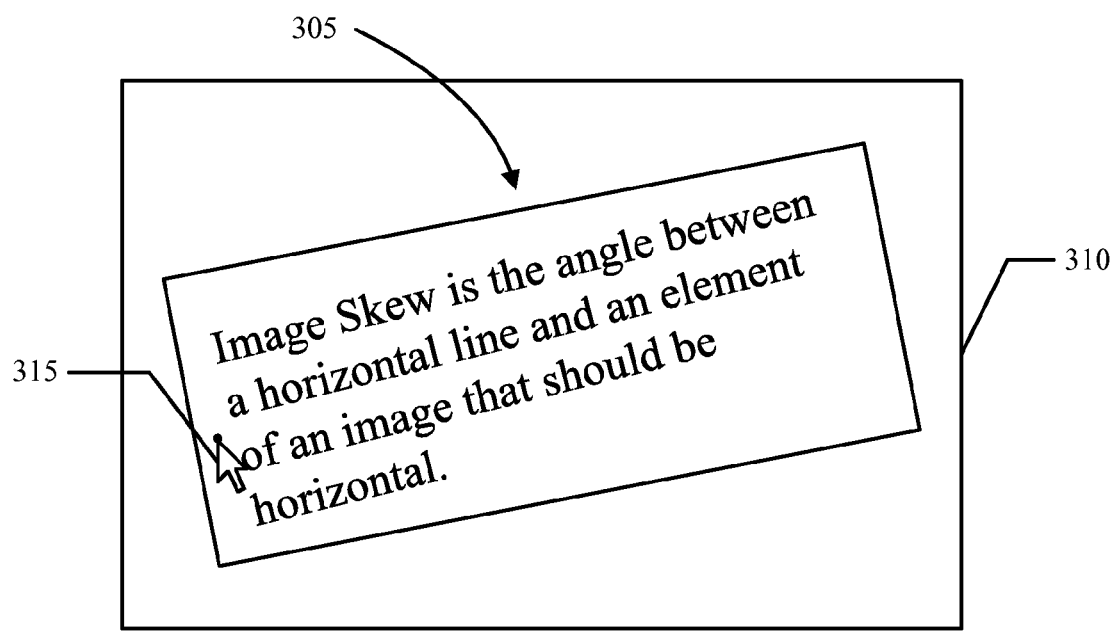

FIGS. 3A-3H show screenshots showing steps of various embodiments of the invention. FIG. 3A shows a screenshot 310 of a skewed image 305. The skewed image in this example is a text image that may have been scanned. FIG. 3B shows an arrow cursor 315 pointing to the first point defining a skew-line within the screenshot 310. The skew-line in this example is being drawn along the line of text within the skewed image 305.

Figure 3C:
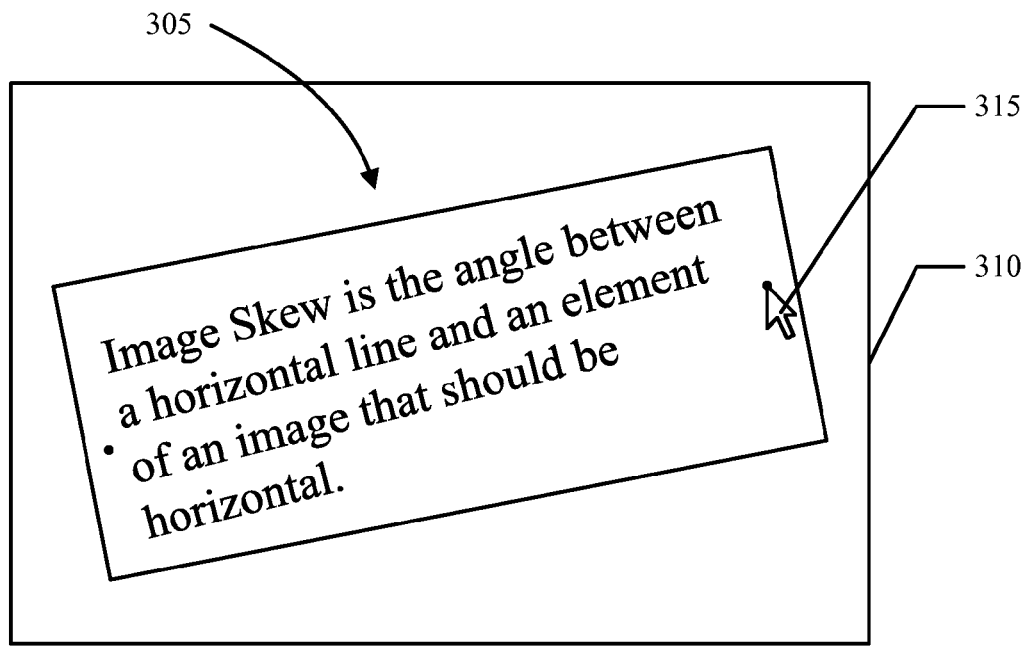
Figure 3D:
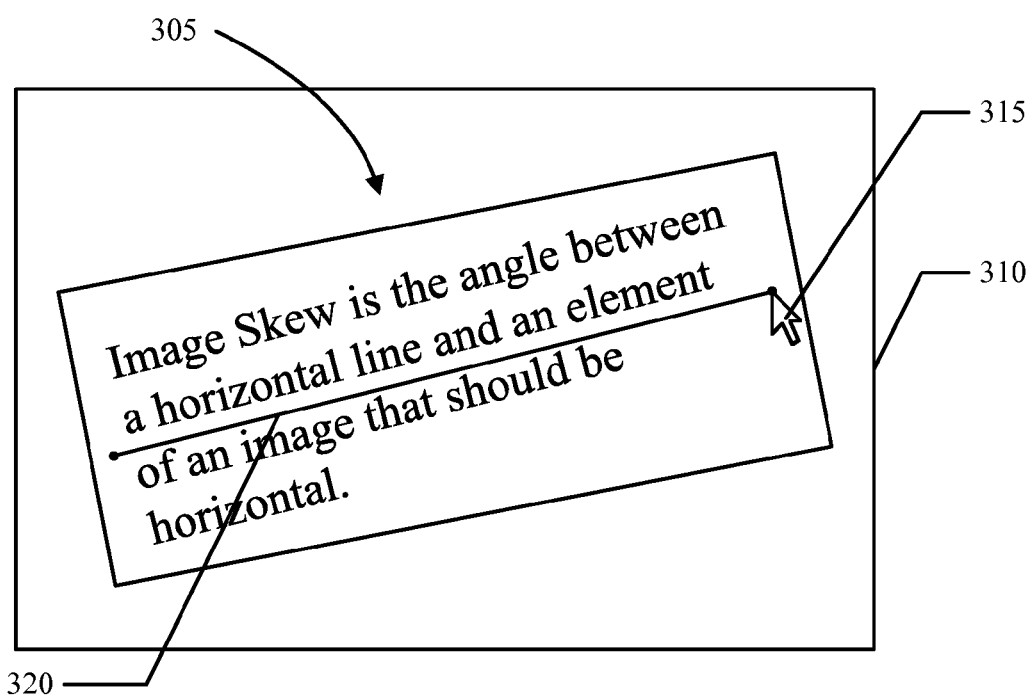
Figure 3E:
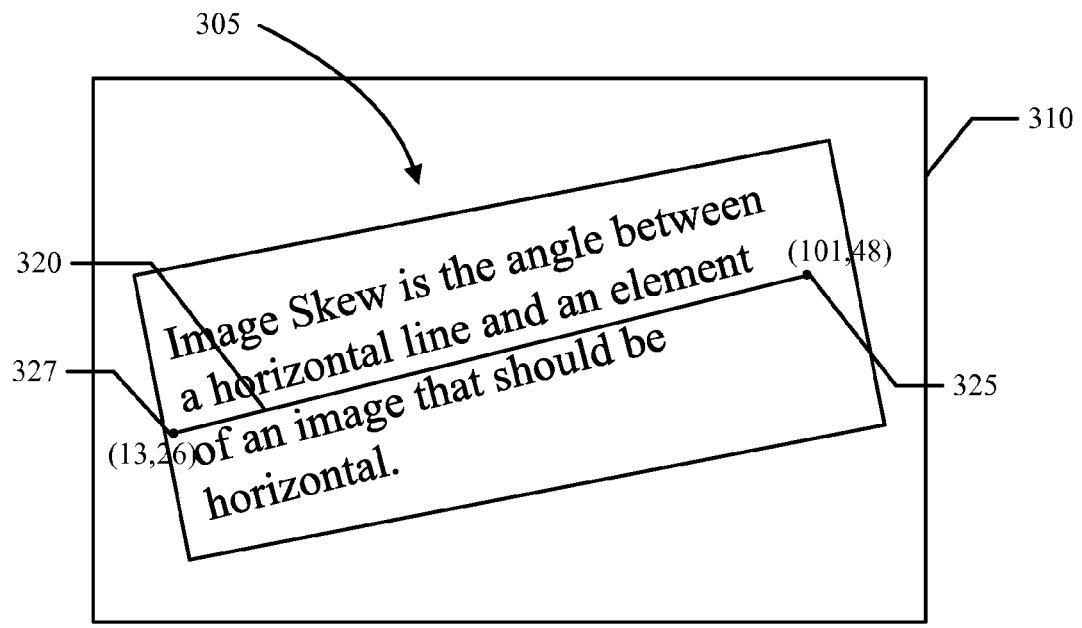
Figure 3F:
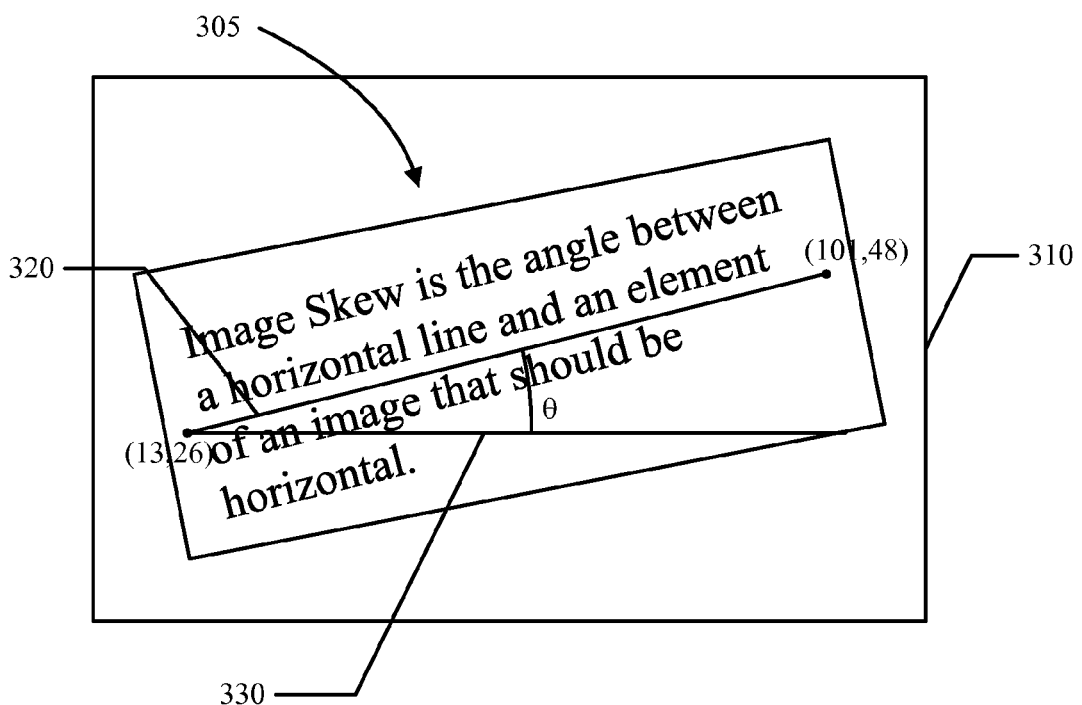

FIG. 3C shows an arrow cursor 315 pointing to the second point defining a skew-line within the screenshot 310. FIG. 3D shows the skew-line 320 drawn between the two points. In another embodiment of the invention, the user may place the first point and then drag a skew-line across the skewed image 305. FIG. 3E shows the skew-line 320 aligned fairly well with the text in the skewed image 305. Of course, the angle or length of the skew-line may be adjusted by the user once the line is in place. The endpoints 325, 327 are emphasized and Cartesian coordinates of the endpoints are shown in FIG. 3F. The first endpoint's coordinates are (13,26) and the second coordinates are (101,48). From the endpoints, the sine and cosine of the skew-angle may be determined using equations 1 and 2. The skew-line and the corresponding sine and cosine may be adjusted dynamically as the user redraws or adjusts the skew-line.

Figures 3G, 3H:
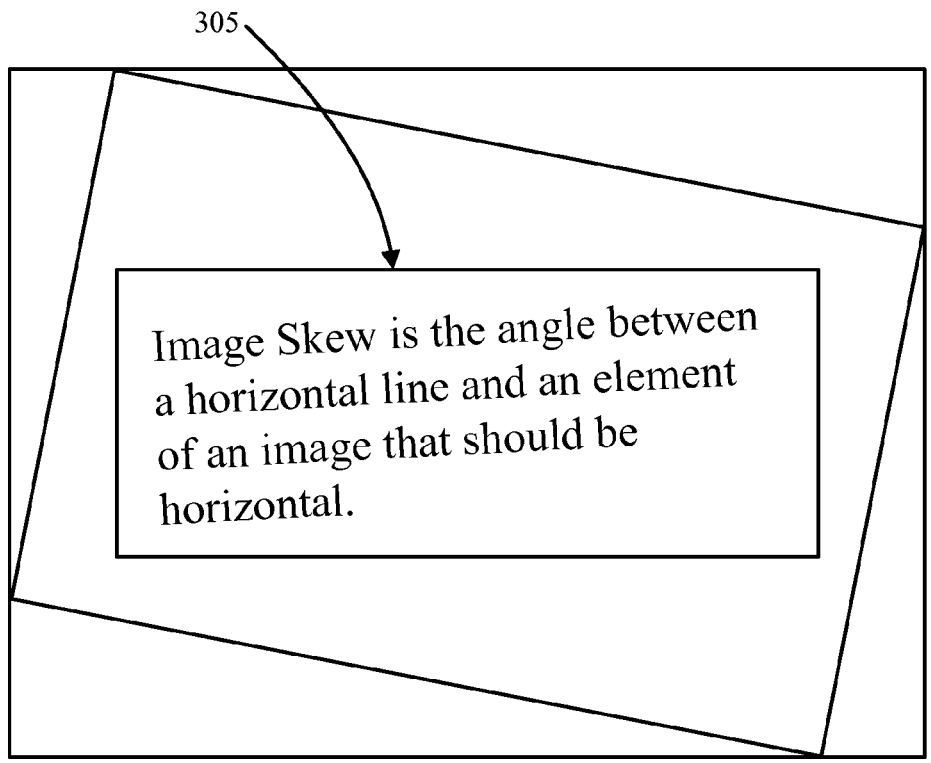
Figure 2A:
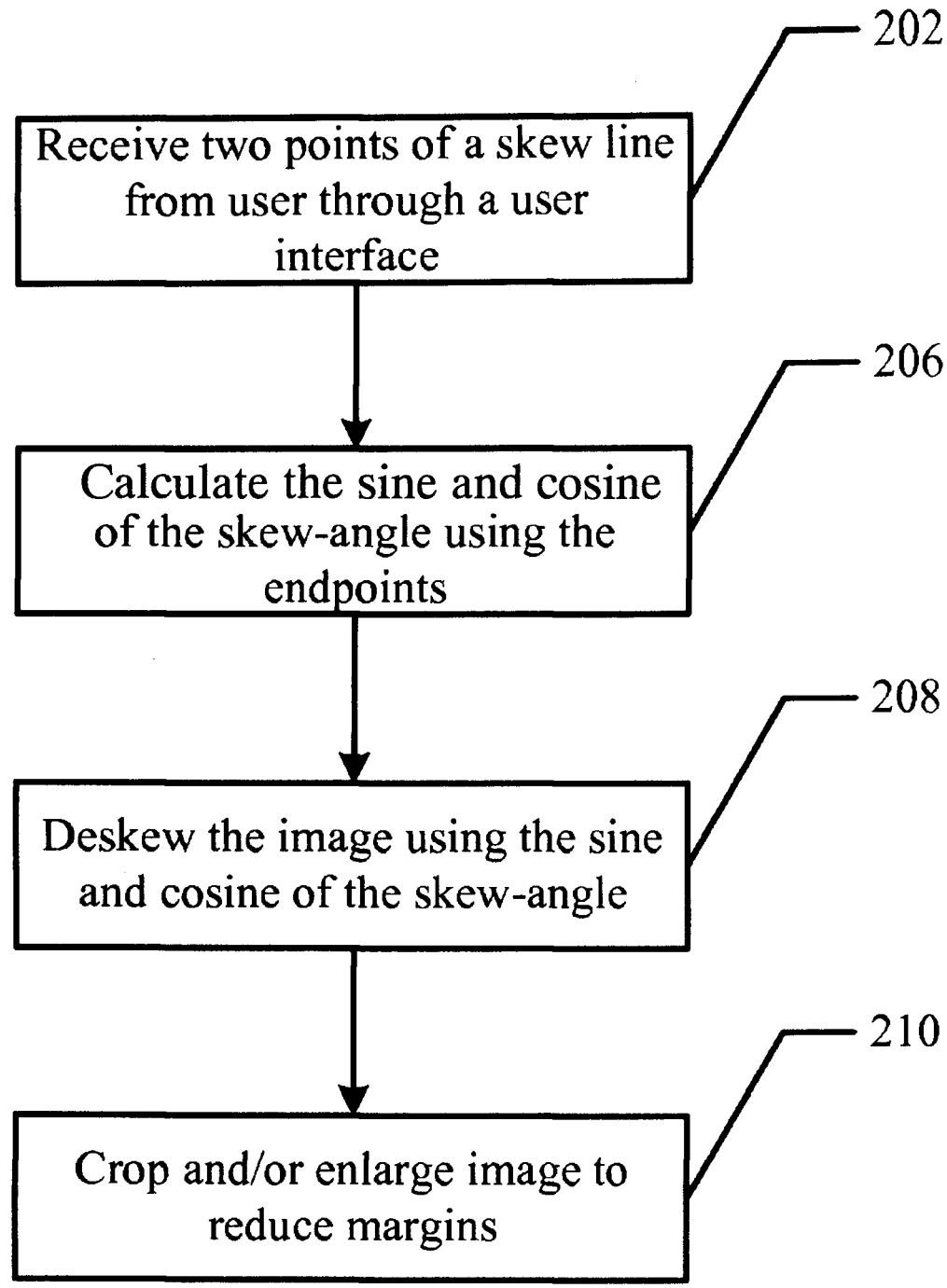

FIG. 3G shows the skewed image 305 deskewed by rotating the image using equations 3 and 4. As can be seen from FIG. 3G, once the image is deskewed the margins are larger than the image. Accordingly, the image may be cropped in order to remove the extra image area as shown in FIG. 3H.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and/or various other mediums capable of storing, containing or carrying instruction(s) and/or data.

While the principles of the disclosure have been described above in connection with specific apparatuses and methods, it is to be clearly understood that this description is made only by way of example and not as limitation on the scope of the disclosure.

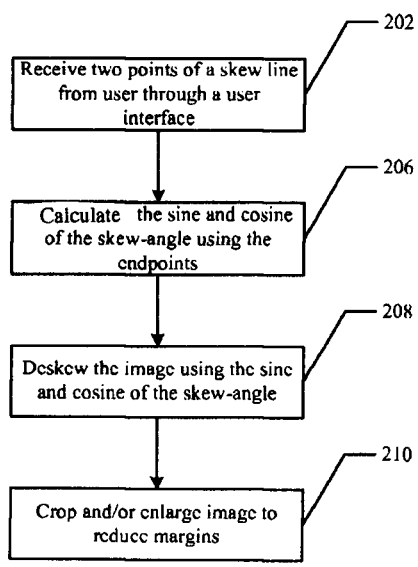

What is claimed is:

1. A method for correcting skew in an image, the method comprising:

receiving, by an input device, at least two distinct points on a skew-line from a user, wherein the at least two distinct points on the skew-line are immediately updated with every move of the input device by the amount specified by a current position of the input device;

calculating the sine and cosine of the skew-angle, wherein the skew-angle is the angle defined by the intersection of the skew-line with respect to a reference line, and the skew-angle is calculated using the points having coordinates $(x_1, y_1)$ and $(x_2, y_2)$, the calculating of the sine and cosine using the formulas:

$$\sin(\theta) = \frac{(y_2 - y_1)}{\sqrt{(y_2 - y_1)^2 + (x_2 - x_1)^2}},$$

$$\cos(\theta) = \frac{(x_2 - x_1)}{\sqrt{(y_2 - y_1)^2 + (x_2 - x_1)^2}}; \text{ and}$$

transforming the image according to the sine and cosine of the skew-angle, wherein the transforming is updated with the movement of the input device.

2. The method according to claim 1, wherein the two of the at least two points are endpoints.

3. The method according to claim 1, wherein the reference line comprises a horizontal line.

4. The method according to claim 1, further comprising cropping the image.

5. The method according to claim 1, wherein the two points of the skew-line are received from a user through a user interface.

6. The method according to claim 1, further comprising displaying the image after the image has been transformed.

7. A method for correcting skew in an image, the method comprising:
 receiving, by an input device, a first endpoint from a user;
 receiving a second endpoint from the user, wherein the first and second endpoints are immediately updated with every move of the input device by the amount specified by a current position of the input device;
 calculating the sine and cosine of the skew-angle, wherein the skew-angle is the angle between a line defined by the first and second endpoints and a reference line, and the sine and cosine are calculated using the first and second endpoints having coordinates $(x_1, y_1)$ and $(x_2, y_2)$ using the formulas:

$$\sin(\theta) = \frac{(y_2 - y_1)}{\sqrt{(y_2 - y_1)^2 + (x_2 - x_1)^2}},$$

$$\cos(\theta) = \frac{(x_2 - x_1)}{\sqrt{(y_2 - y_1)^2 + (x_2 - x_1)^2}}; \text{ and}$$

transforming the image using the sine and cosine of the skew-angle, wherein the transforming is updated with the movement of the input device.

8. The method according to claim 7, further comprising drawing a line between the first endpoint and the second endpoint on the display.

9. A computer system comprising:
 a user interface comprising a pointing device and a display;
 a processor; and
 a memory, wherein the memory comprises:
 instructions to store an image in the memory;
 instructions to display the image on the display;
 instructions to receive a first endpoint and a second endpoint from a user through the pointing device, wherein the first and second endpoints are immediately updated with every move of the input device by the amount specified by a current position of the pointing device;
 instructions to calculate with the processor the sine and cosine of a skew-angle, wherein the skew-angle is the angle between a reference line and a line defined by the first endpoint and the second endpoint, and the sine and cosine are calculated using the first and second endpoints having coordinates $(x_1, y_1)$ and $(x_2, y_2)$ using the formulas:

$$\sin(\theta) = \frac{(y_2 - y_1)}{\sqrt{(y_2 - y_1)^2 + (x_2 - x_1)^2}},$$

$$\cos(\theta) = \frac{(x_2 - x_1)}{\sqrt{(y_2 - y_1)^2 + (x_2 - x_1)^2}}; \text{ and}$$

instructions to transform the image using the sine and cosine of the skew-angle, wherein the transforming is updated with the movement of the input device.

10. The computer system according to claim 9, further comprising instructions to display a symbol representing the first endpoint and a symbol representing the second endpoint on the display.

11. The computer system according to claim 9, further comprising instructions to draw a line defined by the first endpoint and the second endpoint on the display.

12. The computer system according to claim 11, further comprising instructions to erase from the display the line defined by the first endpoint and the second endpoint.

13. The computer system according to claim 9, further comprising instructions to crop the image.

14. The computer system according to claim 9, further comprising instructions to enlarge the image.

15. A non-transitory computer program product comprising:
 a computer readable medium encoded with program code for controlling operation of a computer system, the program code including:
 program code to display an image;
 program code to receive a first endpoint and a second endpoint from a user through a pointing device, wherein the first and second endpoints are immediately updated with every move of the input device by the amount specified by a current position of the pointing device;
 program code to calculate the sine and cosine of the skew-angle, wherein the skew-angle is the angle between a reference line and a line defined by the first endpoint and the second endpoint, and the sine and cosine are calculated using the first and second endpoints having coordinates $(x_1, y_1)$ and $(x_2, y_2)$ using the formulas:

$$\sin(\theta) = \frac{(y_2 - y_1)}{\sqrt{(y_2 - y_1)^2 + (x_2 - x_1)^2}},$$

$$\cos(\theta) = \frac{(x_2 - x_1)}{\sqrt{(y_2 - y_1)^2 + (x_2 - x_1)^2}}; \text{ and}$$

program code to transform the image using the sine and cosine of the skew-angle, wherein the transforming is updated with the movement of the input device.

16. The non-transitory computer program product according to claim 15, further comprising program code to draw a line defined by the first endpoint and the second endpoint.

17. The non-transitory computer program product according to claim 16, further comprising erasing the line defined by the first endpoint and the second endpoint.

18. The non-transitory computer program product according to claim 15, wherein the first endpoint and the second endpoint is received from a user through a user interface.

19. A computer system comprising:
a user interface comprising:
a pointing device;
a scanner;
and a display;
a processor; and
memory, wherein the memory comprises:
instructions to receive an image of a document from a scanner;
instructions to store the image in the memory;
instructions to check the image for skew;
instructions to display the image on the display;
instructions to receive a first endpoint and a second endpoint from a user through the pointing device, wherein the first and second endpoints are immediately updated with every move of the input device by the amount specified by a current position of the pointing device;
instructions to calculate with the processor the cosine and sine of the skew-angle, wherein the skew-angle is the angle between a horizontal line and a line defined by the first endpoint and the second endpoint, and the sine and cosine are calculated using the first and second endpoints having coordinates $(x_1, y_1)$ and $(x_2, y_2)$ using the formulas:

$$\sin(\theta) = \frac{(y_2 - y_1)}{\sqrt{(y_2 - y_1)^2 + (x_2 - x_1)^2}},$$

$$\cos(\theta) = \frac{(x_2 - x_1)}{\sqrt{(y_2 - y_1)^2 + (x_2 - x_1)^2}}; \text{ and}$$

instructions to transform the image using the sine and cosine of the skew-angle, wherein the transforming is updated with the movement of the input device.

20. The method of claim 1, further comprising:
assigning a value to the sine and cosine of the skew-angle in response to the calculating;
performing a check to determine if the value assigned to the cosine is a negative value;
negating the value assigned to the sine and cosine of the skew-angle in response to a determination that the value assigned to the cosine is negative.

21. The method of claim 1, wherein the transforming comprises:
configuring a deskewed image space by creating a composite coordinate (x', y') for each (x, y) coordinate in the skewed image with the equations:

$x'(x,y) = x \cos(\theta) + y \sin(\theta)$, and $y'(x,y) = y \cos(\theta) - x \sin(\theta)$.

* * * * *

UNITED STATES PATENT AND TRADEMARK OFFICE
CERTIFICATE OF CORRECTION

| | |
|---|---|
| PATENT NO. | : 8,249,391 B2 |
| APPLICATION NO. | : 11/844443 |
| DATED | : August 21, 2012 |
| INVENTOR(S) | : Donald B. Curtis |

It is certified that error appears in the above-identified patent and that said Letters Patent is hereby corrected as shown below:

On the Title page:

In the box referenced 206 on the drawing, please delete "the" immediately following 'Calculate'.

Delete the title page and substitute the attached title page therefor.

In the Drawings:

Sheet 4, Fig. 2A, in the box referenced 206, please delete "the" immediately following 'Calculate' as attached.

In the Detailed Description of the Invention:

Column 4, lines 14, please replace "10a" with -- 110a --; line 18, please replace "10a" with -- 110a --.

Column 6, line 31, please replace "$y_{min}$" with -- $y'_{min}$ --; please replace "$x_{min}$" with -- $x'_{min}$ --.

Signed and Sealed this
Nineteenth Day of February, 2013

Teresa Stanek Rea
*Acting Director of the United States Patent and Trademark Office*

(12) United States Patent
Curtis

(10) Patent No.: US 8,249,391 B2
(45) Date of Patent: Aug. 21, 2012

(54) USER INTERFACE METHOD FOR SKEW CORRECTION

(75) Inventor: Donald B. Curtis, Highland, UT (US)

(73) Assignee: Ancestry.com Operations, Inc., Provo, UT (US)

( * ) Notice: Subject to any disclaimer, the term of this patent is extended or adjusted under 35 U.S.C. 154(b) by 1006 days.

(21) Appl. No.: 11/844,443

(22) Filed: Aug. 24, 2007

(65) Prior Publication Data
US 2009/0052802 A1 Feb. 26, 2009

(51) Int. Cl.
G06K 9/32 (2006.01)
G06K 9/36 (2006.01)
G09G 5/00 (2006.01)

(52) U.S. Cl. ........ 382/289; 382/287; 382/276; 382/296; 382/297; 345/648; 345/657

(58) Field of Classification Search ............... 382/289
See application file for complete search history.

(56) References Cited

U.S. PATENT DOCUMENTS

| | | | | |
|---|---|---|---|---|
| 4,654,805 A * | 3/1987 | Shoup, II | ............... | 358/1.3 |
| 4,866,784 A * | 9/1989 | Barski | ............... | 382/289 |
| 5,054,098 A * | 10/1991 | Lee | ............... | 382/289 |
| 5,093,653 A | 3/1992 | Ikehira | | |
| 5,181,260 A * | 1/1993 | Kurosu et al. | ............... | 382/289 |
| 5,187,753 A * | 2/1993 | Bloomberg et al. | ............... | 382/289 |
| 5,307,452 A * | 4/1994 | Hahn et al. | ............... | 345/592 |
| 5,483,626 A * | 1/1996 | Nakayama | ............... | 345/645 |
| 5,563,403 A * | 10/1996 | Bessho et al. | ............... | 250/208.1 |
| 5,568,600 A * | 10/1996 | Kaba | ............... | 345/648 |
| 6,097,855 A * | 8/2000 | Levien | ............... | 382/296 |
| 6,282,326 B1 * | 8/2001 | Lee et al. | ............... | 382/289 |
| 6,333,997 B1 * | 12/2001 | Hashiya et al. | ............... | 382/201 |
| 6,360,026 B1 * | 3/2002 | Kulkarni et al. | ............... | 382/289 |
| 6,418,244 B2 * | 7/2002 | Zhou et al. | ............... | 382/306 |
| 6,430,320 B1 | 8/2002 | Jia et al. | | |
| 7,027,666 B2 * | 4/2006 | Rudak et al. | ............... | 382/289 |
| 7,065,261 B1 * | 6/2006 | Horie | ............... | 382/289 |
| 7,145,699 B2 * | 12/2006 | Dolan | ............... | 358/452 |
| 7,277,600 B2 * | 10/2007 | Najman | ............... | 382/289 |
| 7,340,110 B2 * | 3/2008 | Lim et al. | ............... | 382/289 |
| 7,542,165 B2 * | 6/2009 | Kawakatsu et al. | ............... | 358/1.3 |
| 2002/0164087 A1 * | 11/2002 | Chien et al. | ............... | 382/289 |
| 2004/0120604 A1 * | 6/2004 | Najman | ............... | 382/289 |
| 2004/0130552 A1 * | 7/2004 | Duluk et al. | ............... | 345/506 |
| 2005/0031167 A1 * | 2/2005 | Hu et al. | ............... | 382/103 |
| 2005/0058367 A1 * | 3/2005 | Fujimoto | ............... | 382/276 |

OTHER PUBLICATIONS ftp://ftp.gimp.org/pub/gimp/v2.2/ (2.2.12 on Jul. 6, 2006).*
http://web.archive.org/web/20060718040101/http://docs.gimp.org/en/gimp-tool-rotate.html (Jul. 18, 2006).*

* cited by examiner

*Primary Examiner* — Michelle Entezari
(74) *Attorney, Agent, or Firm* — Kilpatrick Townsend & Stockton LLP

(57) ABSTRACT

Methods and systems for correcting skew in digital images are disclosed according to embodiments of the invention. Embodiments may include receiving the endpoints of the skew-line, calculating the sine and cosine of the skew-angle from the endpoints and rotating the image using the sine and cosine of the skew-angle. Embodiments of the invention may also include various ways for a user to provide a skew-line and/or endpoints.

21 Claims, 9 Drawing Sheets